US012688584B2

(12) United States Patent (10) Patent No.: US 12,688,584 B2
Seong et al. (45) Date of Patent: Jul. 21, 2026

(54) IMAGE PROCESSING DEVICE AND IMAGE PROCESSING METHOD FOR PERFORMING PARALLEL INTERPOLATION ON GROUPED SUB-REGIONS

(71) Applicant: SK hynix Inc., Icheon-si (KR)

(72) Inventors: Yon Woo Seong, Icheon-si (KR); Ji Hyun Son, Icheon-si (KR); Hyun Gu Shin, Icheon-si (KR); Dae Hyun Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 403 days.

(21) Appl. No.: 18/343,582

(22) Filed: Jun. 28, 2023

(65) Prior Publication Data

US 2024/0202925 A1     Jun. 20, 2024

(30) Foreign Application Priority Data

Dec. 20, 2022   (KR) ........................ 10-2022-0179772

(51) Int. Cl.
G06T 7/11 (2017.01)
G06T 3/4007 (2024.01)

(52) U.S. Cl.
CPC .............. G06T 7/11 (2017.01); G06T 3/4007 (2013.01)

(58) Field of Classification Search
CPC . G06T 7/11; G06T 3/4007; G06T 7/10; G06T 7/269; G06T 2207/20021; H04N 23/84
See application file for complete search history.

(56) References Cited

U.S. PATENT DOCUMENTS

| | | | | |
|---|---|---|---|---|
| 9,053,562 | B1* | 6/2015 | Rabin | ...................... H04S 7/30 |
| 11,443,433 | B2* | 9/2022 | Udupa | ................. G06V 10/764 |
| 12,298,486 | B2* | 5/2025 | Dixon | .................... G02B 5/201 |
| 2012/0287135 | A1* | 11/2012 | Pfeifle | .................... G06T 11/23 |
| | | | | 345/442 |
| 2018/0315196 | A1* | 11/2018 | Socek | .................... G06V 10/56 |
| 2019/0001887 | A1* | 1/2019 | Guerreiro | ............. G06T 3/4007 |
| 2019/0172197 | A1* | 6/2019 | Buckler | ................. G06F 18/24 |
| 2019/0209116 | A1* | 7/2019 | Sjöstrand | ............... G16H 50/30 |
| 2019/0362163 | A1* | 11/2019 | Siegemund | .......... G06V 10/751 |
| 2020/0074636 | A1* | 3/2020 | Ouji | ........................ G06T 7/187 |
| 2020/0074642 | A1* | 3/2020 | Wilson | .................... G06T 7/174 |
| 2020/0126236 | A1* | 4/2020 | Rister | ................. G06F 18/2148 |
| 2022/0198209 | A1* | 6/2022 | Spears | ...................... G06T 7/12 |
| 2023/0181146 | A1* | 6/2023 | Tong | .................. G01R 33/5608 |
| | | | | 378/62 |

(Continued)

FOREIGN PATENT DOCUMENTS

| | | |
|---|---|---|
| KR | 1020160086984 A | 7/2016 |
| KR | 1020210002578 A | 1/2021 |

*Primary Examiner* — Mia M Thomas
(74) *Attorney, Agent, or Firm* — WILLIAM PARK AND ASSOCIATES LTD.

(57) ABSTRACT

An image processing device includes a segment component configured to divide an image into sub-regions based on pixel values of the image received from outside of the image processing device. The image processing device also includes a sub-region manager configured to classify the sub-regions into a plurality of groups according to interpolation operations to be performed on the sub-regions. The image processing device further includes an image interpolator configured to perform interpolation operations on sub-regions of the same group in parallel.

20 Claims, 9 Drawing Sheets

(56)                   References Cited

U.S. PATENT DOCUMENTS

| 2024/0119361 | A1* | 4/2024 | Yin | G06N 3/084 |
| 2024/0185398 | A1* | 6/2024 | Kim | G06V 10/56 |
| 2025/0012724 | A1* | 1/2025 | Bortnik | G01J 3/28 |
| 2025/0217925 | A1* | 7/2025 | Possos | G06T 3/40 |

* cited by examiner

IMAGE PROCESSING DEVICE AND IMAGE PROCESSING METHOD FOR PERFORMING PARALLEL INTERPOLATION ON GROUPED SUB-REGIONS

CROSS-REFERENCE TO RELATED APPLICATION

The present application claims priority under 35 U.S.C. § 119(a) to Korean patent application number 10-2022-0179772 filed on Dec. 20, 2022, in the Korean Intellectual Property Office, the entire disclosure of which is incorporated by reference herein.

BACKGROUND

1. Technical Field

The present disclosure relates to an image processing device, and more particularly, to an image processing device and an image processing method.

2. Related Art

An image sensor may be generally classified as a charge coupled device (CCD) image sensor or a complementary metal oxide semiconductor (CMOS) image sensor. Recently, the CMOS image sensor that is inexpensive to manufacture, consumes little power, and is easy to integrate with a peripheral circuit has been attracting attention.

An image sensor included in a smart phone, a tablet PC, a digital camera, or the like may convert light reflected from an external object into an electrical signal, to obtain image information on the external object. An image signal processing device may convert the electrical signal obtained from the image sensor or perform operations of improving image quality.

The image signal processing device may divide an image into a plurality of regions and perform image processing operations on each of the divided regions. According to the divided regions, the time required for the image processing operation may vary. The image signal processing device may perform the image processing operations in parallel. The time required for the image processing operations performed in parallel may be determined according to an operation for which the required time is the greatest among image processing operations which require different amounts of time. Therefore, resource waste can be decreased by increasing the efficiency of the parallel image processing operation.

SUMMARY

An embodiment of the present disclosure provides an image processing device and an image processing method for performing interpolation operations on a sub-region in which the same interpolation operation is performed among interpolation operations to be performed on divided sub-regions in parallel.

According to an embodiment of the present disclosure, an image processing device may include: a segment component configured to divide an image into sub-regions based on pixel values of the image received from outside of the image processing device; a sub-region manager configured to classify the sub-regions into a plurality of groups according to interpolation operations to be performed on the sub-regions;

and an image interpolator configured to perform interpolation operations on sub-regions of the same group in parallel.

According to an embodiment of the present disclosure, an image processing device may include: a segment component configured to divide an image into sub-regions based on pixel values of the image received from outside of the image processing device and generate indication information indicating the sub-regions; a sub-region manager configured to store indication information on sub-regions on which the same interpolation operation is performed based on interpolation operations to be performed on the sub-regions; and an image interpolator configured to perform interpolation operations on the sub-regions on which the same interpolation operation is performed in parallel based on the indication information.

According to an embodiment of the present disclosure, an image processing method may include: dividing an image into sub-regions based on pixel values of the image received from outside of an image processing device; classifying the sub-regions into a plurality of groups according to interpolation operations to be performed on the sub-regions; and performing interpolation operations on sub-regions of the same group in parallel.

According to the present technology, an image processing device capable of improving operation performance and reducing interpolation operation performance time by performing the same interpolation operation in parallel may be provided.

BRIEF DESCRIPTION OF THE DRAWINGS

FIG. 4 is a diagram illustrating a method of dividing an image into sub-regions according to an embodiment of the present disclosure.

FIG. 7 is a diagram illustrating a method of performing an interpolation operation in parallel according to an embodiment of the present disclosure.

FIG. 8 is a diagram illustrating interpolation operations performed in graphics processing units according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, to describe in detail enough that a person of ordinary skill in the art to which the present disclosure pertains may implement the technical spirit of the present disclosure, an embodiment of the present disclosure is described with reference to the accompanying drawings.

Figure 1:
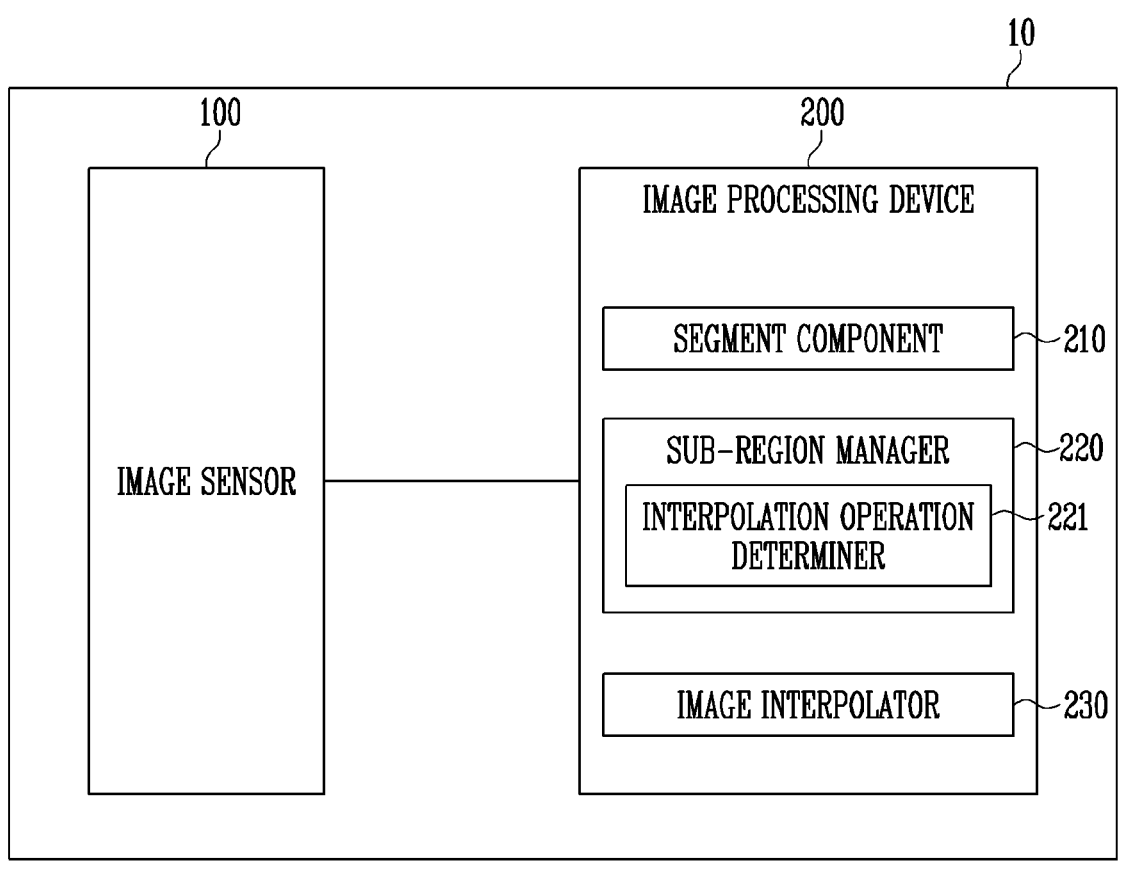
FIG. 1 is a diagram illustrating an image processing system according to an embodiment of the present disclosure.

FIG. 1 is a diagram illustrating an image processing system 10 according to an embodiment of the present disclosure.

Referring to FIG. 1, the image processing system 10 may include an image sensor 100 and an image processing device 200.

The image processing system 10 may obtain image data and process the obtained image data. The image processing system 10 may store, display, or output an output image on which an image processing operation is performed to an external device. The image processing system 10 may output the output image to a host according to a request of the host.

The image sensor 100 may generate the image data based on light received from outside of the image sensor 100 or the image processing system 10. The image sensor 100 may include pixels. The image sensor 100 may generate pixel values corresponding to a sensed image from the pixels. The image data may include the pixel values. The pixel values generated by the image sensor 100 may be transmitted to the image processing device 200.

The pixel values generated by the image sensor 100 may correspond to a single frame. The image sensor 100 may sequentially generate pixel values corresponding to a multi-frame.

The image processing device 200 may receive a plurality of pixel values from the image sensor 100 including the pixels. The image processing device 200 may perform an image processing operation based on the received pixel values. In an embodiment of the present disclosure, the image processing operation may mean electronic image stabilization (EIS), interpolation, tone correction, image quality correction, size adjustment operations, and the like of the sensed image. The image processing device 200 may include a segment component 210, a sub-region manager 220, and an image interpolator 230.

The segment component 210 may divide the image into sub-regions based on the pixel values of the image received from outside of the segment component 210 or the image processing system 10. The segment component 210 may generate sub-regions into which the image is divided based on at least one of a boundary included in the image or a color difference between of the image. The boundary included in the image may be a line dividing between objects included in the image or a line dividing the object and a background.

The sub-region manager 220 may classify the sub-regions into a plurality of groups according to interpolation operations to be performed on the sub-regions. The sub-region manager 220 may include sub-regions on which the same interpolation operation is to be performed in the same group. The sub-region manager 220 may further include an interpolation operation determiner 221 that determines the interpolation operations to be performed on the sub-regions.

The interpolation operation determiner 221 may calculate a variation, a gradient, or an image pattern corresponding to each of the sub-regions based on the pixel values. The interpolation operation determiner 221 may determine the interpolation operation to be performed on the sub-regions based on the calculated variation, gradient, or image pattern.

The image interpolator 230 may perform interpolation operations on sub-regions of the same group in parallel. The image interpolator 230 may generate interpolation operation commands for each of the sub-regions. The image interpolator 230 may generate queues including interpolation operation commands corresponding to the same group. The image interpolator 230 may simultaneously execute interpolation operation commands included in the same queue.

The image processing device 200 may divide the image into the sub-regions according to an interpolation characteristic, and may simultaneously perform the same or similar operations to be performed among the interpolation operations on the sub-regions. The operations performed by the image processing device 200 may be simultaneously ended or an end time different of the operations performed by the image processing device 200 may be small. Accordingly, an idle time of graphics processing units performing an operation may be reduced or minimized, and thus image processing performance may be improved.

Figures 2, 3:
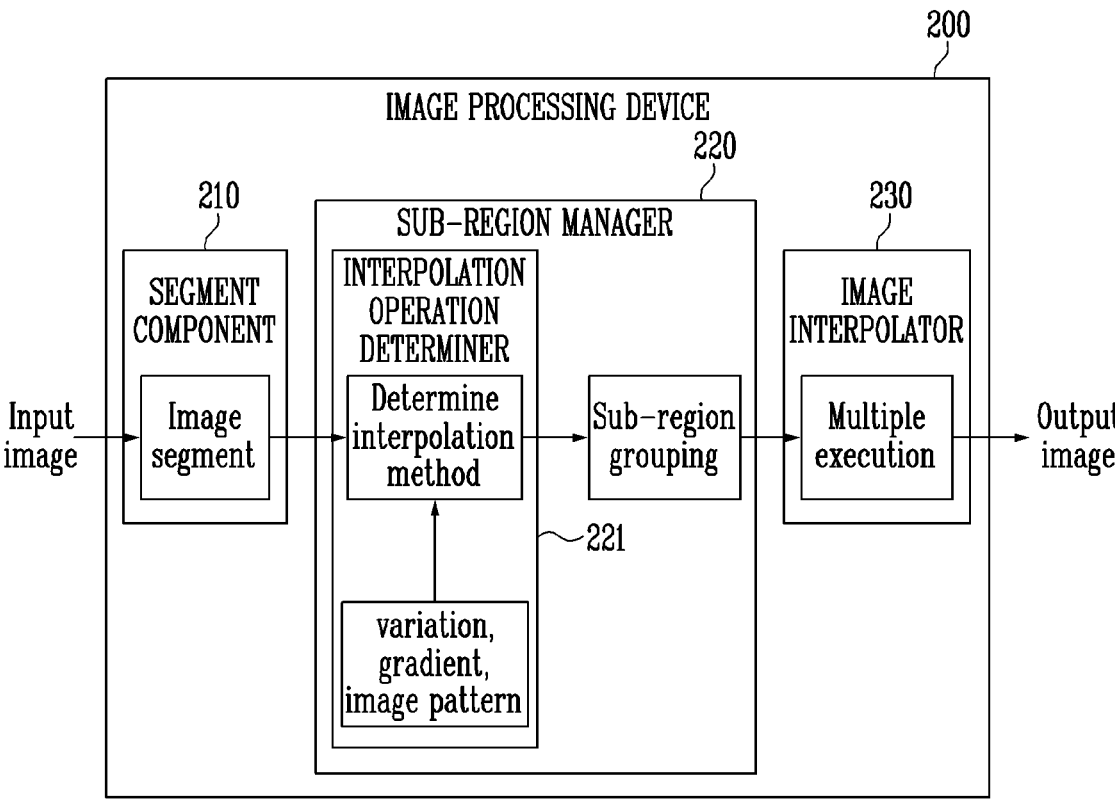
FIG. 2 is a diagram illustrating an image processing method according to an embodiment of the present disclosure.
FIG. 3 is a diagram illustrating a method of performing an interpolation operation on sub-regions into which an image is divided according to an embodiment of the present disclosure.

FIG. 2 is a diagram illustrating an image processing method according to an embodiment of the present disclosure.

Referring to FIG. 2, the image processing device 200 may output the image data by interpolating the input image data. Different interpolation processes may be performed for each sub-region included in the image. In an embodiment of the present disclosure, sub-regions of the same interpolation method may be grouped, and an operation on the grouped sub-regions may be performed in parallel.

The segment component 210 may receive the pixel values indicating the input image. The segment component 210 may divide the input image into the sub-regions based on the pixel values. The segment component 210 may generate indication information indicating the sub-regions.

In an embodiment of the present disclosure, a single interpolation operation may be performed in one sub-region. Interpolation operations performed on different sub-regions may be the same. The segment component 210 may generate the sub-regions based on the interpolation operation performed on the sub-regions. The segment component 210 may divide the input image in various methods.

In another embodiment of the present disclosure, the segment component 210 may divide the received image into sub-regions of the same size. The segment component 210 may adjust the size of the sub-regions so that a single interpolation operation is performed in one sub-region. Each of the sub-regions may have the same characteristic corresponding to the performed interpolation operation.

The interpolation operation determiner 221 may calculate a variation corresponding to each of the sub-regions based on the pixel values. The interpolation operation determiner 221 may determine an interpolation operation corresponding to the variation based on a predetermined threshold value.

In an embodiment of the present disclosure, the interpolation operation determiner 221 may calculate a gradient corresponding to each of the sub-regions based on the pixel values. The interpolation operation determiner 221 may determine an interpolation operation corresponding to the gradient based on a predetermined threshold value.

In an embodiment of the present disclosure, the interpolation operation determiner 221 may determine an interpolation operation corresponding to an image pattern corresponding to each of the sub-regions determined based on the pixel values. The interpolation operation determiner 221 may variously determine the interpolation operations to be performed corresponding to the interpolation characteristic of the sub-regions based on the pixel values.

In another embodiment of the present disclosure, the interpolation operation determiner 221 may determine the interpolation operations to be performed on each of the sub-regions based on at least one of variation of the pixel values, a gradient in a predetermined direction, or an image pattern. For example, the interpolation operation determiner 221 may determine a directionality of the sub-region based on the pixel values. The directionality of the sub-region may clearly appear when a boundary is included in the sub-region or a certain pattern exists.

When a difference between pixel values of a horizontal direction is greater than a difference between the pixel values of a vertical direction, a corresponding sub-region may have a directionality of the vertical direction, and the difference between the pixel values may indicate a strength of the directionality. In another embodiment of the present disclosure, the directionality of the sub-region may be set in a direction in which a difference between the pixel values is the greatest. The interpolation operation determiner 221 may determine that the same interpolation operation is to be performed on sub-regions having the same directivity or a difference in directivity within a certain range.

The sub-region manager 220 may group the sub-regions of the same interpolation method into the same group. The interpolation operation on the sub-regions included in the same group may be performed in parallel.

In an embodiment of the present disclosure, the graphics processing unit may perform an operation required for the interpolation operation performed on the sub-region. The operation required time of the graphics processing unit for the same interpolation operation may be the same. The graphics processing unit may simultaneously complete the operation on the sub-regions in response to performance of the interpolation operation for each group.

In another embodiment of the present disclosure, the sub-region manager 220 may store indication information on the sub-regions on which the same interpolation operation is performed based on the interpolation operations to be performed on the sub-regions. The interpolation operation determiner 221 may determine that at least two interpolation operations are to be performed in the sub-regions. The sub-region manager 220 may store indication information on the sub-regions on which the same interpolation operation is performed in the same buffer.

The image interpolator 230 may generate interpolation operation performance queues for the sub-regions based on the indication information stored in the same buffer. The image interpolator 230 may transmit interpolation operation commands included in the same queue to the graphics processing units, respectively. The image interpolator 230 may simultaneously perform the interpolation operations for the same queue. The image interpolator 230 may control the graphics processing units to simultaneously perform operations corresponding to the received interpolation operation commands.

In an embodiment of the present disclosure, the interpolation operation determiner 221 may determine the interpolation operations to be performed on the sub-regions based on the variation and the gradient of the pixel values. For example, the interpolation operation determiner 221 may calculate an interpolation characteristic of a first sub-region with a first gradient in a first direction, a second gradient in a second direction, and a first variation with respect to a pixel value. The interpolation operation determiner 221 may determine an interpolation operation to be performed on the first sub-region as the first interpolation operation by comparing the first gradient, the second gradient, and the first variation with predetermined references. In a similar method, the interpolation operation determiner 221 may determine an interpolation operation performed on the first sub-region, a second sub-region, a fourth sub-region, and a fifth sub-region as the first interpolation operation. The interpolation operation determiner 221 may determine an interpolation operation performed on a third sub-region and a sixth sub-region as a second interpolation operation.

The sub-region manager 220 may classify the first sub-region, the second sub-region, the fourth sub-region, and the fifth sub-region into a first group, and classify the third sub-region and the sixth sub-region into a second group. The image interpolator 230 may generate interpolation operation commands for the first sub-region to the sixth sub-region. The image interpolator 230 may generate a first queue including interpolation operation commands for the first sub-region, the second sub-region, the fourth sub-region, and the fifth sub-region classified into the first group. The image interpolator 230 may generate a second queue including interpolation operation commands for the third sub-region and the sixth sub-region classified into the second group.

The image interpolator 230 may transmit the interpolation operation commands included in the first queue to the graphics processing units, respectively. The graphics processing units may simultaneously perform the received interpolation operation commands. The image interpolator 230 may transmit the interpolation operation commands included in the second queue to the graphics processing units, respectively, after the interpolation operation commands included in the first queue are executed. The image interpolator 230 may perform the interpolation operations included in the second queue after all interpolation operations included in the first queue are ended.

For example, the interpolation operation command for the first sub-region may be transmitted to a first graphics processing unit, the interpolation operation command for the second sub-region may be transmitted to a second graphics processing unit, the interpolation operation command for the fourth sub-region may be transmitted to a third graphics processing unit, and the interpolation operation command for the fifth sub-region may be transmitted to a fourth graphics processing unit. Operations related to the interpolation operation performed by the first to fourth graphics processing units may be the same or similar to each other. The operations related to the interpolation operation performed by the first to fourth graphics processing units may be simultaneously ended or an end time difference of the operations related to the interpolation operation performed by the first to fourth graphics processing units may be small. Accordingly, an idle state of the first to fourth graphics processing units between the first queue and the second queue may be shortened. Therefore, the performance time of the interpolation operations performed by the first to fourth graphics processing units may be shortened, and thus performance may be improved.

FIG. 3 is a diagram illustrating a method of performing an interpolation operation on sub-regions into which an image is divided according to an embodiment of the present disclosure.

Referring to FIG. 3, an input image 310 may be divided into a plurality of sub-regions. In FIG. 3, the input image 310 may be divided into nine sub-regions. Indication information that may indicate a position in the input image 310 may be set in each of the sub-regions. In an embodiment of the present disclosure, the indication information may be a coordinate.

In FIG. 3, the input image 310 may be divided into nine sub-regions. A coordinate capable of specifying a position in the input image 310 may be assigned in each of the sub-regions. Coordinate information of (0, 0) may be set in a first sub-region 320. Coordinate information of (0, 1) may be set in a second sub-region 330.

The first sub-region 320 may be positioned at a left uppermost end of the input image 310. A position of the sub-regions may be specified in the input image 310 by coordinate information.

In an embodiment of the present disclosure, an interpolation operation on the input image 310 may be divided into interpolation operations on each of the sub-regions and performed. In FIG. 3, an image on which the interpolation operation on the input image 310 is performed may be obtained by combining a result of the interpolation operations performed on each of the nine sub-regions.

In an embodiment of the present disclosure, an image characteristic of the first sub-region 320 and an image characteristic of the second sub-region 330 may be different from each other. The interpolation operation on the sub-region may be determined according to an image characteristic of the sub-region. That is, the interpolation operation on the first sub-region 320 and the interpolation operation on the second sub-region 330 may be different from each other.

When the interpolation operations are different from each other, the time required to perform the interpolation operation may be different. The graphics processing units may simultaneously start operation performance. When the time required for operation performance is different for each graphics processing unit, graphics processing units for which an operation has ended may wait in an idle state until an operation of all graphics processing units has ended.

When different interpolation operations are performed in parallel, the time required to perform the interpolation operation may increase due to the graphics processing units waiting in the idle state. In an embodiment of the present disclosure, the time required for the interpolation operation may be reduced by dividing the image so that the time required for the interpolation operation is the same and performing the same interpolation operation in parallel.

Figure 4:
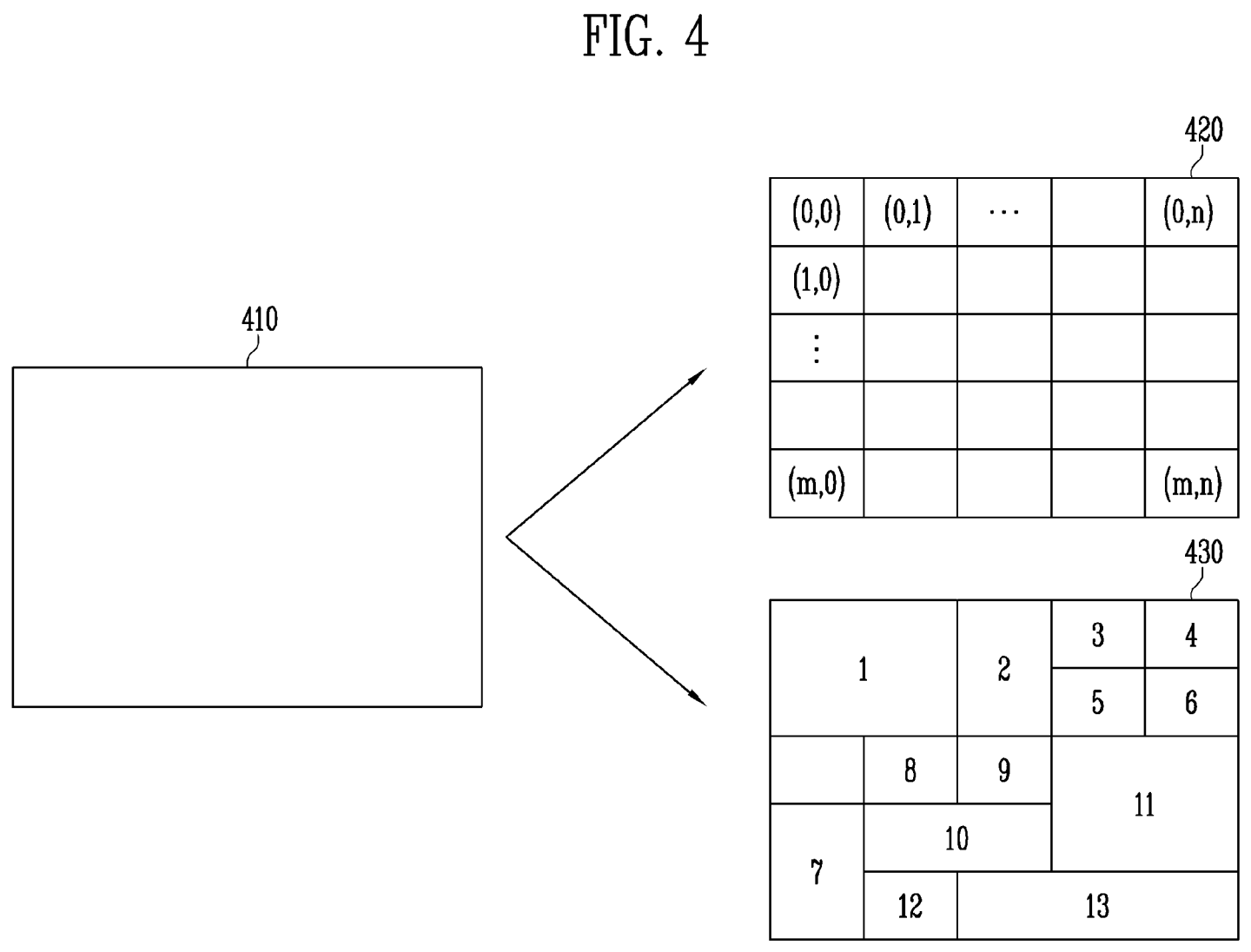

FIG. 4 is a diagram illustrating a method of dividing an image into sub-regions according to an embodiment of the present disclosure.

Referring to FIG. 4, an input image 410 may be divided into sub-regions. In an embodiment of the present disclosure, the input image 410 may be divided into sub-regions 420 of the same size. In another embodiment of the present disclosure, the input image 410 may be divided into sub-regions 430 of various sizes. FIG. 4 may be described together with the configurations of FIG. 2.

In FIG. 4, the input image 410 may be divided into sub-regions 420 of the same size. The sub-regions 420 may be divided into (m+1)*(n+1) sub-regions. When the number of sub-regions is sufficiently large, a single interpolation operation may be performed in one sub-region.

In FIG. 4, the input image 410 may be divided into sub-regions 430 of various sizes. In an embodiment of the present disclosure, it is illustrated that the image 410 may be divided into 13 sub-regions, but this is only an example and the number of sub-regions is not limited thereto.

The segment component 210 may divide the image into the sub-regions based on the pixel values of the image received from outside of the segment component 210 or the image processing system 10. The segment component 210 may generate the sub-regions into which the image is divided based on at least one of the boundary included in the image or the color difference of the image.

A size and a shape of the sub-regions divided by the segment component 210 may be various. Each of the sub-regions may have the same characteristic corresponding to the performed interpolation operation. The boundary included in the image may be a line dividing between objects included in the image or a line dividing the object and the background.

In an embodiment of the present disclosure, the segment component 210 may divide the image into the sub-regions based on the pixel values of the image received from outside of the segment component 210 or the image processing system 10. The segment component 210 may generate the indication information indicating the sub-regions. The indication information may be position information specifying the position of the sub-regions in the image.

Figures 5, 6:
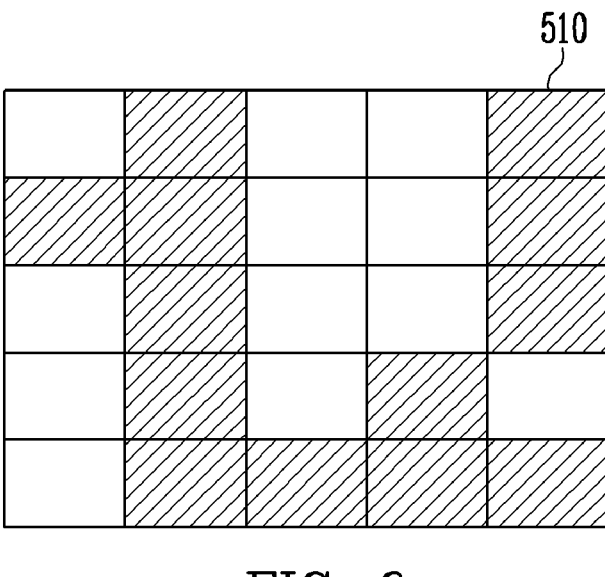
FIG. 5 is a diagram illustrating interpolation operations performed in sub-regions according to an embodiment of the present disclosure.
FIG. 6 is a diagram illustrating interpolation operations performed in sub-regions according to another embodiment of the present disclosure.

FIG. 5 is a diagram illustrating interpolation operations performed in sub-regions according to an embodiment of the present disclosure.

Referring to FIG. 5, the sub-regions 510 may be divided into a first group corresponding to hatched regions and a second group corresponding to remaining regions. The first interpolation operation may be performed on the first group, and the second interpolation operation may be performed on the second group. In FIG. 5, it may be assumed that the divided sub-regions have the same size. FIG. 5 may be described together with the configurations of FIG. 2.

The interpolation operation determiner 221 may determine the interpolation operations to be performed on the sub-regions based on at least one of the variation of the pixel values corresponding to each of the sub-regions, the gradient in the predetermined direction, or the image pattern of the sub-regions. In FIG. 5, it may be assumed that the interpolation operation determiner 221 determines the interpolation operation based on the variation of the pixel values.

The interpolation operation determiner 221 may calculate the variation corresponding to each of the sub-regions based on the pixel values. The interpolation operation determiner 221 may determine the interpolation operation corresponding to the variation based on a predetermined threshold value.

The interpolation operation determiner 221 may determine the interpolation operation as the first interpolation operation in response to the variation greater than the threshold value. The interpolation operation determiner 221 may determine the interpolation operation as the second interpolation operation in response to the variation being less than or equal to the threshold value. A type of the interpolation operation described with reference to FIG. 5 is only an example, and the interpolation operation included in the sub-region is not limited to the first interpolation operation and the second interpolation operation. For example, two or more types of interpolation operations may be performed on the sub-region.

In FIG. 5, the interpolation operation determiner 221 may determine the interpolation operations performed on the hatched regions as the first interpolation operation. A pixel value variation of the hatched regions may be greater than the predetermined threshold value. The interpolation operation determiner 221 may determine interpolation operations performed on the remaining regions as the second interpolation operation. A pixel value variation of the remaining regions may be less than or equal to the predetermined threshold value.

The sub-region manager 220 may classify the hatched regions as the first group and classify the remaining regions as the second group. The image interpolator 230 may perform the interpolation operations on the sub-regions of the same group in parallel.

The image interpolator 230 may generate interpolation operation commands for each of the sub-regions. The image interpolator 230 may generate queues including the inter-polation operation commands corresponding to the same group. A type of interpolation operation commands included in one queue may be the same. The image interpolator 230 may simultaneously execute the interpolation operation commands included in the same queue. A plurality of graphics processing units may perform an operation in parallel in response to a simultaneous execution of the interpolation operation commands. The operation of the plurality of graphics processing units may be simultaneously started or completed.

In an embodiment of the present disclosure, the image interpolator 230 may transmit the interpolation operation commands included in the same queue to the graphics processing units, respectively. The image interpolator 230 may control the graphics processing units to simultaneously perform the operations corresponding to the received inter-polation operation commands.

In FIG. 5, the image interpolator 230 may the first queue including the interpolation operation commands correspond-ing to the hatched regions. The image interpolator 230 may transmit the interpolation operation commands included in the first queue to the graphics processing units, respectively, and thus the graphics processing units may simultaneously perform the first interpolation operation.

Similarly, the image interpolator 230 may generate the second queue including the interpolation operation com-mands corresponding to the remaining regions. The image interpolator 230 may transmit the interpolation operation commands included in the second queue to the graphics processing units, respectively, after the interpolation opera-tion corresponding to the first queue is completed. The graphics processing units may simultaneously perform the second interpolation operation after the first interpolation operation is performed in parallel.

FIG. 6 is a diagram illustrating interpolation operations performed in sub-regions according to another embodiment of the present disclosure.

Referring to FIG. 6, the sub-regions 610 may be divided into a first group corresponding to hatched regions, a second group corresponding to shaded regions, and a third group corresponding to remaining regions. A first interpolation operation may be performed on the first group, and a second interpolation operation may be performed on the second group. A third interpolation operation may be performed on the third group.

In FIG. 6, it may be assumed that the image is divided into the sub-regions 610 of various sizes. In FIG. 6, not only the sizes but also the shapes of the sub-regions 610 may be various. FIG. 6 may be described together with the configu-rations of FIG. 2.

The interpolation operation determiner 221 may deter-mine the interpolation operations to be performed on the sub-regions based on at least one of the variation of the pixel values corresponding to each of the sub-regions, the gradient in the predetermined direction, or the image pattern of the sub-regions. In FIG. 6, it may be assumed that the interpo-lation operation determiner 221 determines the interpolation operation based on the gradient in the predetermined direc-tion.

The gradient corresponding to each of the sub-regions may be calculated based on the pixel values. The interpo-lation operation determiner 221 may determine the interpo-lation operation corresponding to the gradient based on a predetermined threshold value.

The interpolation operation determiner 221 may deter-mine the interpolation operation as the first interpolation operation in response to a gradient being greater than a first threshold value. The interpolation operations performed on the hatched regions in FIG. 6 may be determined as the first interpolation operation.

The interpolation operation determiner 221 may deter-mine the interpolation operation as the second interpolation operation in response to a gradient being equal to or less than the first threshold value and greater than a second threshold value. The interpolation operations performed on the shaded regions in FIG. 6 may be determined as the second inter-polation operation.

The interpolation operation determiner 221 may deter-mine the interpolation operation as the third interpolation operation in response to a gradient being less than or equal to the second threshold value. In FIG. 6, the interpolation operations performed on the remaining regions may be determined as the third interpolation operation.

In an embodiment of the present disclosure, the interpo-lation operation determiner 221 may determine a corre-sponding interpolation operation from a sub-region for which a size is large. That is, the interpolation operation determiner 221 may determine an interpolation operation on a sub-region for which a size is small after determining the interpolation operation on the sub-region for which the size is large.

Figure 7:
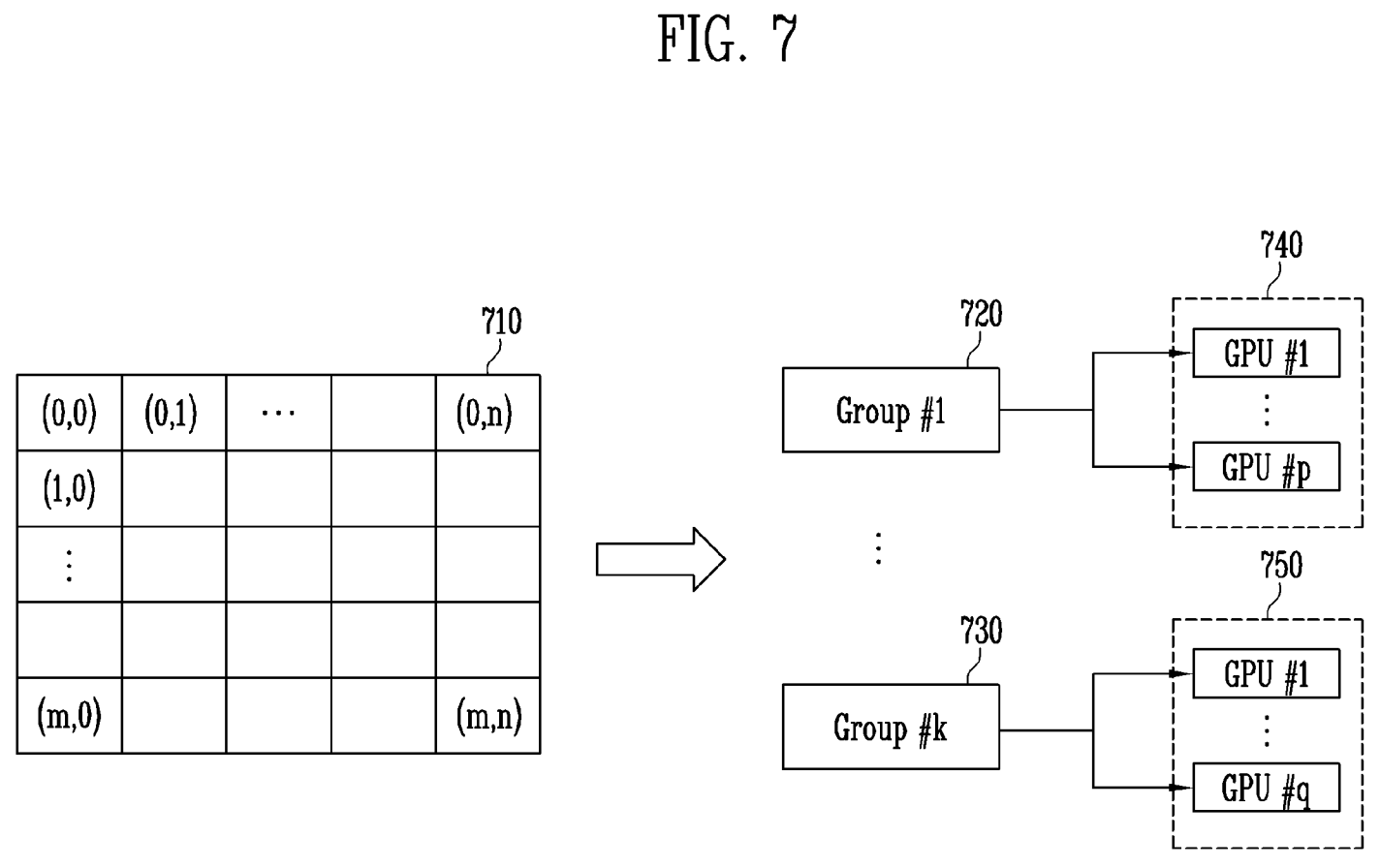

FIG. 7 is a diagram illustrating a method of performing an interpolation operation in parallel according to an embodi-ment of the present disclosure.

Referring to FIG. 7, an input image 710 may be divided into sub-regions. The divided sub-regions may be classified into a plurality of groups 720 and 730 according to an interpolation method to be performed. An interpolation operation on sub-regions included in the same group may be performed in parallel by graphics processing units 740 and 750.

In FIG. 7, it may be assumed that sizes of the sub-regions are the same. The sub-regions may be classified into k groups according to the interpolation operations to be per-formed in the sub-regions. FIG. 7 may be described together with the configurations of FIG. 2.

The segment component 210 may divide the received image into the sub-regions of the same size. The segment component 210 may adjust the size of the sub-regions so that a single interpolation operation is performed in one sub-region. In FIG. 7, the sub-regions 720 may be divided into (m+1)*(n+1) sub-regions. When the number of sub-regions is sufficiently large, a single interpolation operation may be performed in one sub-region.

The sub-region manager 220 may classify the sub-regions into a plurality of groups according to the interpolation operations to be performed on the sub-regions. The sub-region manager 220 may include the sub-regions on which the same interpolation operation is to be performed in the same group. The interpolation operations to be performed on the sub-regions may be determined by the interpolation operation determiner based on at least one of the variation of the pixel values corresponding to each of the sub-regions, the gradient in the predetermined direction, or the image pattern of the sub-regions.

In FIG. 7, the number of groups including the sub-regions may be k. The number of groups may vary according to a type of the interpolation operations to be performed in the sub-regions. The type of the interpolation operation may be determined according to the interpolation characteristic of the sub-regions.

In another embodiment of the present disclosure, the sub-region manager 220 may store the indication information on the sub-regions on which the same interpolation operation is performed based on the interpolation operations to be performed on the sub-regions. The interpolation operation determiner 221 may determine that at least two interpolation operations are performed in the sub-regions. The sub-region manager 220 may store the indication information on the sub-regions on which the same interpolation operation is performed in the same buffer.

The image interpolator 230 may perform the interpolation operations on the sub-regions of the same group in parallel. The image interpolator 230 may generate the interpolation operation commands for each of the sub-regions. The image interpolator 230 may generate queues including interpolation operation commands corresponding to the same group. The image interpolator 230 may simultaneously execute the interpolation operation commands included in the same queue.

In an embodiment of the present disclosure, the image interpolator 230 may transmit the interpolation operation commands included in the same queue to the graphics processing units 740 and 750, respectively. The image interpolator 230 may control the graphics processing units to simultaneously perform operations corresponding to the received interpolation operation commands.

In FIG. 7, the number of graphics processing units corresponding to a first group may be different from the number of graphics processing units corresponding to a k-th group. The number of graphics processing units corresponding to each group may vary according to the number of sub-regions included in each of the plurality of groups.

In an embodiment of the present disclosure, the segment component 210 may divide the image into the sub-regions based on the pixel values of the image 710 received from outside of the segment component 210 or the image processing system 10. The segment component 210 may generate the indication information indicating the sub-regions. The sub-region manager 220 may store the indication information on the sub-regions on which the same interpolation operation is performed based on the interpolation operations to be performed on the sub-regions. In an embodiment of the present disclosure, the indication information may be coordinate information.

The interpolation operation determiner 221 may determine the interpolation operations to be performed on the sub-regions based on at least one of the variation of the pixel values corresponding to each of the sub-regions, the gradient in the predetermined direction, or the image pattern of the sub-regions. The interpolation operation determiner 221 may determine that at least two interpolation operations are performed in the sub-regions. The sub-region manager 220 may store the indication information on the sub-regions on which the same interpolation operation is performed in the same buffer.

The image interpolator 230 may perform the interpolation operations on the sub-regions on which the same interpolation operation is performed in parallel based on the indication information. The image interpolator 230 may generate the interpolation operation performance queues for the sub-regions based on the indication information stored in the same buffer. The image interpolator 230 may simultaneously perform the interpolation operations for the same queue. Each of the interpolation operation performance queues may include the indication information on the sub-regions on which the same interpolation operation is performed.

Figure 8:
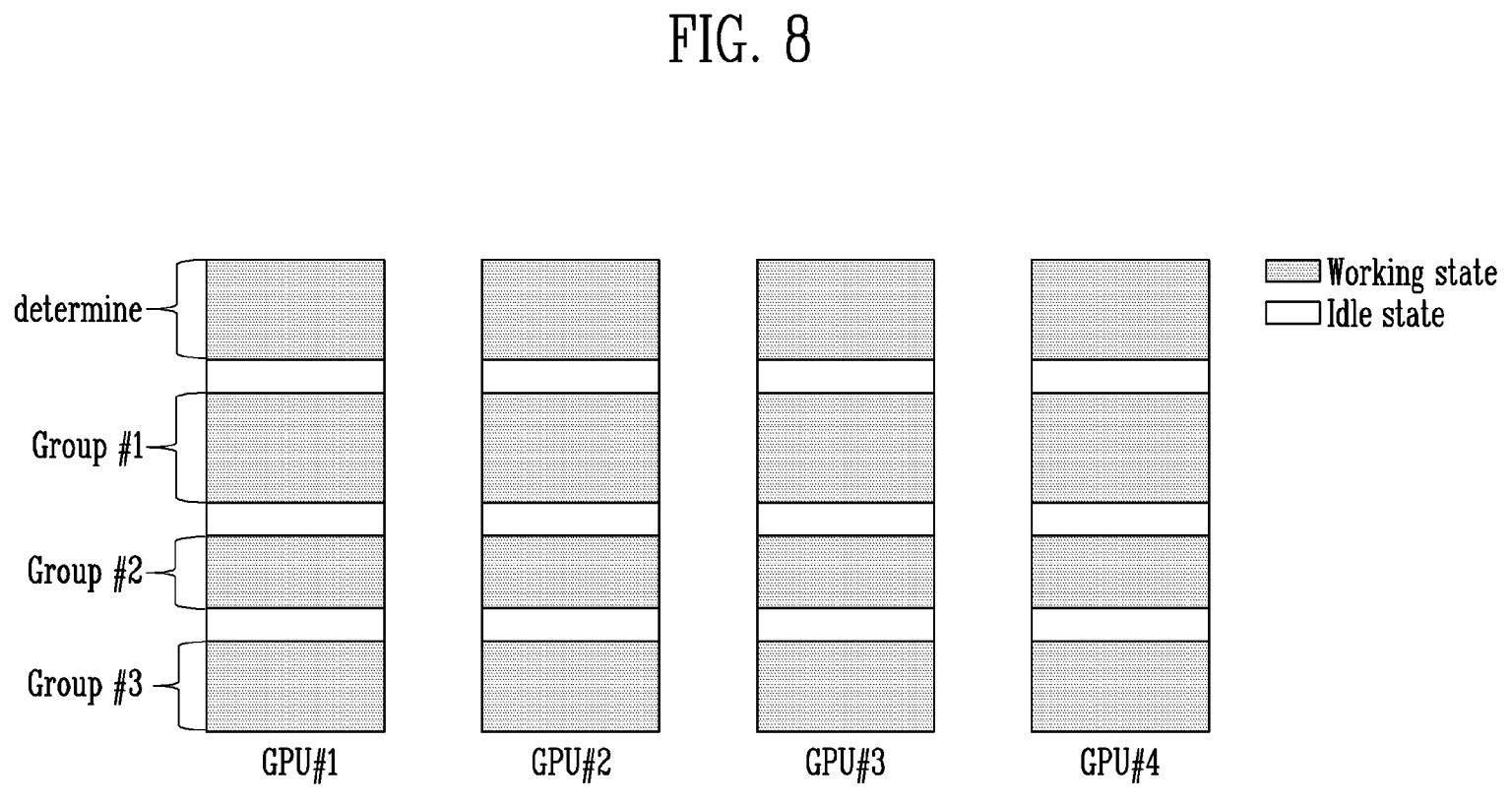

FIG. 8 is a diagram illustrating interpolation operations performed in graphics processing units according to an embodiment of the present disclosure.

Referring to FIG. 8, an operation related to an interpolation operation may be performed by graphics processing units GPU #1, GPU #2, GPU #3, and GPU #4. In FIG. 8, it may be assumed that the number of graphics processing units is eight and the number of groups performing different interpolation operations is three. FIG. 8 may be described together with the configurations of FIG. 2.

In FIG. 8, the interpolation operations to be performed in the sub-regions may be determined by the segment component 210, the sub-region manager 220, and the interpolation operation determiner 221. The graphics processing units GPU #1, GPU #2, GPU #3, and GPU #4 may perform an operation of determining the interpolation operations before performing the interpolation operation on the sub-regions.

The graphics processing units GPU #1, GPU #2, GPU #3, and GPU #4 may wait in an idle state until a next operation is started when one operation has ended. The graphics processing units GPU #1, GPU #2, GPU #3, and GPU #4 may wait in the idle state until an operation of other graphics processing units has ended.

In an embodiment of the present disclosure, the first interpolation operation for the first group may be performed by the graphics processing units GPU #1, GPU #2, GPU #3, and GPU #4. Since an interpolation characteristic of the sub-regions on which the first interpolation operation is performed is the same or similar, the operation of the graphics processing units GPU #1, GPU #2, GPU #3, and GPU #4 may be ended at the same or similar time point.

The first interpolation operation ends, and then the second interpolation operation for the second group may be performed by the graphics processing units GPU #1, GPU #2, GPU #3, and GPU #4. Similarly to the first interpolation operation, since an interpolation characteristic of the sub-regions on which the second interpolation operation is performed is the same or similar, the operation of the graphics processing units GPU #1, GPU #2, GPU #3, and GPU #4 may be ended at the same or similar time point.

The third interpolation operation for the third group may be performed similarly to the first and second interpolation operations. Since operation end time points of the graphics processing units GPU #1, GPU #2, GPU #3, and GPU #4 are the same or similar, parallelism of the graphics processing units GPU #1, GPU #2, GPU #3, and GPU #4 may be improved.

According to an embodiment of the present disclosure, a time that the graphics processing units GPU #1, GPU #2, GPU #3, and GPU #4 are maintained in the idle state may be shortened. As the idle state maintenance time of the graphics processing units GPU #1, GPU #2, GPU #3, and GPU #4 becomes shorter, an image interpolation operation performance speed may be improved.

Figure 9:
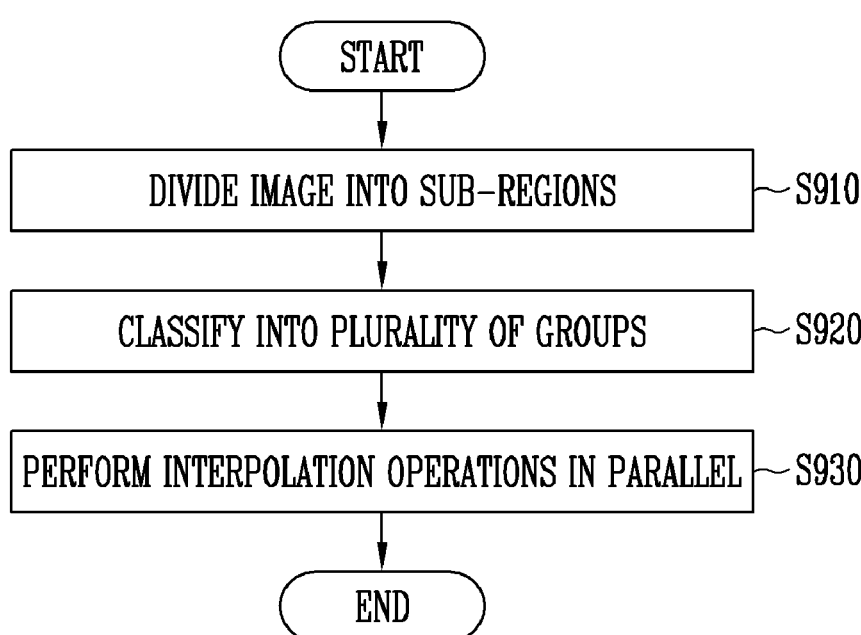
FIG. 9 is a flowchart illustrating image interpolation operations according to an embodiment of the present disclosure.

FIG. 9 is a flowchart illustrating image interpolation operations according to an embodiment of the present disclosure.

Referring to FIG. 9, the interpolation operations on the sub-regions into which the input image is divided may be performed in parallel. FIG. 9 may be described together with the configurations of FIG. 2.

In step S910, the segment component 210 may divide the image into the sub-regions based on the pixel values of the image received from outside of the segment component 210 or the image processing system 10. The segment component 210 may divide the image into the sub-regions based on the pixel values of the image received from outside of the segment component 210 or the image processing system 10. The segment component 210 may generate the sub-regions into which the image is divided based on at least one of the boundary included in the image or the color difference of the image.

The description of the segment component 210 of FIGS. 1 and 2 may correspond to the description of step S910.

In step S920, the sub-region manager 220 may classify the sub-regions into the plurality of groups according to the interpolation operations to be performed on the sub-regions. The sub-region manager 220 may include the sub-regions on which the same interpolation operation is to be performed in the same group. The sub-region manager 220 may further include the interpolation operation determiner 221 that determines the interpolation operations to be performed on the sub-regions based on at least one of the variation of the pixel values corresponding to each of the sub-regions, the gradient in the predetermined direction, or the image pattern of the sub-regions.

In another embodiment of the present disclosure, the sub-region manager 220 may store the indication information on the sub-regions on which the same interpolation operation is performed based on the interpolation operations to be performed on the sub-regions. The interpolation operation determiner 221 may determine that at least two interpolation operations are performed in the sub-regions. The sub-region manager 220 may store the indication information on the sub-regions on which the same interpolation operation is performed in the same buffer.

The description of the sub-region manager 220 and the interpolation operation determiner 221 of FIGS. 1 and 2 may correspond to the description of step S920.

In step S930, the image interpolator 230 may perform the interpolation operations on the sub-regions of the same group in parallel. The description of the image interpolator 230 of FIGS. 1, 2, 7, and 8 may correspond to the description of step S930.

Figure 10:
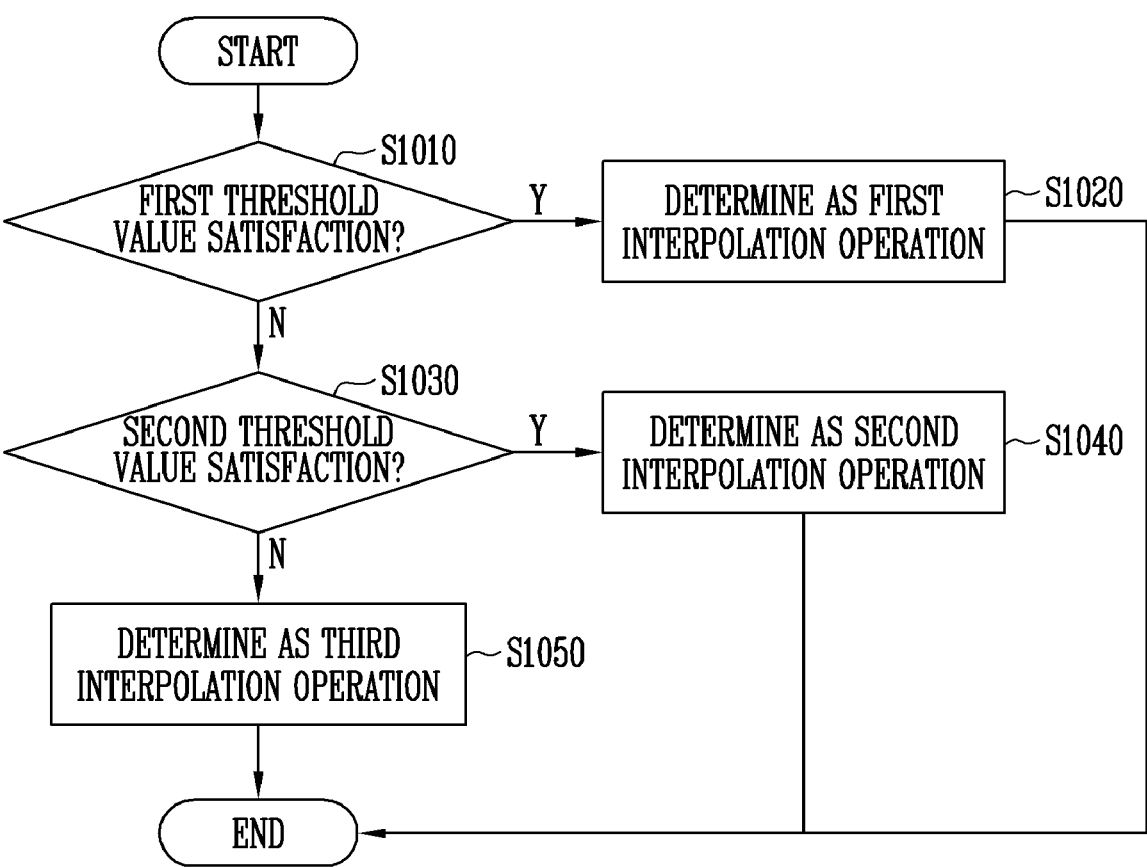
FIG. 10 is a flowchart illustrating a method of determining interpolation operations of sub-regions according to an embodiment of the present disclosure.

FIG. 10 is a flowchart illustrating a method of determining interpolation operations of sub-regions according to an embodiment of the present disclosure.

Referring to FIG. 10, the interpolation operation determiner 221 may determine the interpolation operations to be performed on the sub-regions based on at least one of the variation of the pixel values corresponding to each of the sub-regions, the gradient in the predetermined direction, or the image pattern of the sub-regions. FIG. 10 may be described together with the configurations of FIG. 2.

In step S1010, the interpolation operation determiner 221 may compare at least one of the variation of the pixel values corresponding to each of the sub-regions, the gradient in the predetermined direction, or the image pattern of the sub-regions with the first threshold value. The interpolation operation determiner 221 may calculate a degree to which the image pattern matches a predetermined first reference pattern.

In step S1020, the interpolation operation determiner 221 may determine the interpolation operation of the sub-regions as the first interpolation operation in response to the variation or the gradient of the pixel values greater than the first threshold value. The interpolation operation determiner 221 may determine the interpolation operation of the sub-regions as the first interpolation operation in response to a degree, to which the image pattern of the sub-region matches the first reference pattern, exceeding a reference value.

In step S1030, the interpolation operation determiner 221 may compare at least one of the variation of the pixel values corresponding to each of the sub-regions, the gradient in the predetermined direction, or the image pattern of the sub-regions with the second threshold value. The interpolation operation determiner 221 may calculate a degree to which the image pattern matches a predetermined second reference pattern.

In step S1040, the interpolation operation determiner 221 may determine the interpolation operation of the sub-regions as the second interpolation operation in response to a variation or a gradient of pixel values equal to or less than the first threshold value and greater than the second threshold value. The interpolation operation determiner 221 may determine the interpolation operation of the sub-regions as the second interpolation operation in response to a degree, to which the image pattern of the sub-region matches the second reference pattern, exceeding the reference value.

In step S1050, the interpolation operation determiner 221 may determine the interpolation operation of the sub-regions as the third interpolation operation in response to a variation or a gradient of pixel values equal to or less than the second threshold value and greater than a third threshold value. The interpolation operation determiner 221 may determine the interpolation operation of the sub-regions as the third interpolation operation in response to a degree, to which the image pattern of the sub-region matches the second reference pattern, equal to or less than the reference value.

The interpolation operation determiner 221 may calculate the variation corresponding to each of the sub-regions based on the pixel values. The interpolation operation determiner 221 may determine the interpolation operation corresponding to the variation based on the predetermined threshold value.

Steps S1010, S1020, S1030, S1040, and S1050 of FIG. 10 may correspond to the description of the interpolation operations performed in the sub-regions of FIG. 6.

Figure 11:
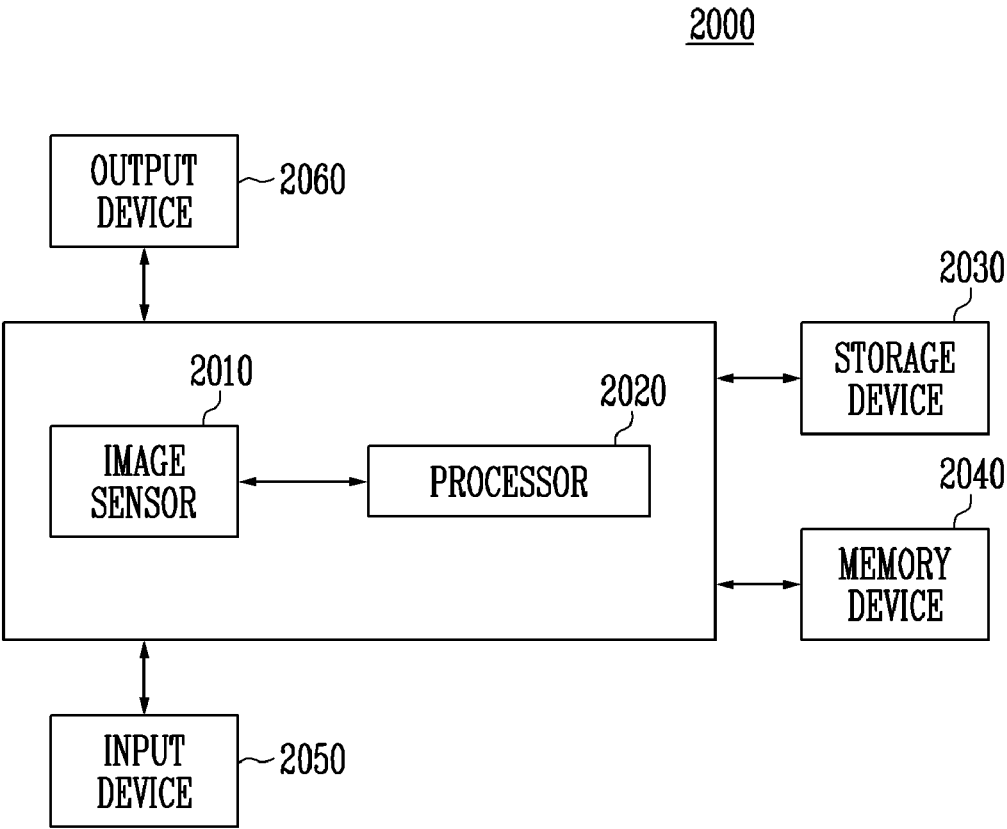
FIG. 11 is a block diagram illustrating an electronic device including an image processing device according to an embodiment of the present disclosure.

FIG. 11 is a block diagram illustrating an electronic device 2000 including an image processing device according to an embodiment of the present disclosure.

Referring to FIG. 11, the electronic device 2000 may include an image sensor 2010, a processor 2020, a storage device 2030, a memory device 2040, an input device 2050, and an output device 2060. Although not shown in FIG. 11, the electronic device 2000 may further include ports capable of communicating with a video card, a sound card, a memory card, a USB device, or the like, or communicating with other electronic devices.

The image sensor 2010 may generate image data corresponding to incident light. The output device 2060 may display the image data. The storage device 2030 may store the image data. The processor 2020 may control the operation of the image sensor 2010, the storage device 2030, and the output device 2060.

The processor 2020 may perform specific calculations or tasks. The processor 2020 may execute and control the operation of the electronic device 2000. According to an embodiment of the present disclosure, the processor 2020 may be a microprocessor, a central processing unit (CPU), or an application processor (AP).

The processor 2020 may be implemented as a chip independent of the image sensor 2010. For example, the processor 2020 may be implemented as a multi-chip package. In another embodiment of the present disclosure, the processor 2020 may be included as a part of the image sensor 2010 and implemented as a single chip.

The processor 2020 may be connected to the storage device 2030, the memory device 2040, the input device 2050, and the output device 2060 through an address bus, a control bus, and a data bus to perform communication. According to an embodiment of the present disclosure, the processor 2020 may also be connected to an expansion bus such as a peripheral component interconnect (PCI) bus.

In an embodiment of the present disclosure, the processor 2020 may divide an input image into sub-regions and group the sub-regions according to interpolation operations to be performed on the sub-regions. The processor 2020 may perform the interpolation operations on the sub-regions included in the same group in parallel. In particular, when parallelism of an operation is maintained, graphics processing units may simultaneously start and complete the operation. Due to the operation parallelism of the graphics processing units, idle time of the graphics processing units may be reduced, thereby increasing operation efficiency.

The storage device 2030 may include a flash memory device, a solid state drive (SSD), a hard disk drive (HDD), a CD-ROM, all types of nonvolatile memory devices, and the like.

The memory device 2040 may store data required for the operation of the electronic device 2000. For example, the memory device 2040 may include a volatile memory device such as a dynamic random-access memory (DRAM) or a static random-access memory (SRAM) and a nonvolatile memory device such as an erasable programmable read-only memory (EPROM), an electrically erasable programmable read-only memory (EEPROM), and a flash memory device. The processor 2020 may execute a command set stored in the memory device 2040 to control the image sensor 2010 and the output device 2060.

The input device 2050 may include an input means and the like such as a keyboard, a keypad, and a mouse. The output device 2060 may include an output means such as a printer and a display.

The image sensor 2010 may be implemented as various types of packages. For example, at least some configurations of the image sensor 2010 may be implemented using packages such as a package on package (PoP), ball grid arrays (BGAs), chip scale packages (CSPs), plastic leaded chip carriers (PLCC), a plastic dual in-line package (PDIP), a die in waffle pack, die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

According to an embodiment, the image sensor 2010 and the processor 2020 may be integrated in one chip or each of the image sensor 2010 and the processor 2020 may be integrated in different chips.

Meanwhile, the electronic device 2000 may be interpreted as all computing systems using the image sensor 2010. The electronic device 2000 may be implemented in the form of a packaged module, a part, or the like. For example, the electronic device 2000 may be implemented as a digital camera, a mobile device, a smart phone, a personal computer (PC), a tablet personal computer (PC), a notebook, a personal digital assistant (PDA), an enterprise digital assistant (EDA), a portable multimedia player (PMP), a wearable device, a black box, a robot, an autonomous vehicle, or the like.

The scope of the present disclosure is indicated by the claims to be described later rather than the detailed description, and all changes or modifications derived from the meaning and scope of the claims and their equivalent concepts are interpreted as being included in the scope of the present disclosure.

What is claimed is:

1. An image processing device comprising:
a segment component processor configured to divide an image into sub-regions based on pixel values of the image received from outside of the image processing device;
a sub-region manager configured to classify the sub-regions into a plurality of groups according to interpolation operations to be performed on the sub-regions; and
an image interpolator configured to perform interpolation operations on sub-regions of the same group in parallel.

2. The image processing device of claim 1, wherein the sub-region manager divides sub-regions on which the same interpolation operation is to be performed into the same group, and
the sub-region manager further comprises an interpolation operation determiner configured to determine the interpolation operations based on at least one of a variation of pixel values corresponding to each of the sub-regions, a gradient in a predetermined direction, or an image pattern of the sub-regions.

3. The image processing device of claim 2, wherein the interpolation operation determiner calculates the variation based on the pixel values and determines an interpolation operation corresponding to the variation based on a predetermined threshold value.

4. The image processing device of claim 3, wherein the interpolation operation determiner determines the interpolation operation as a first interpolation operation in response to a variation being greater than the threshold value.

5. The image processing device of claim 4, wherein the interpolation operation determiner determines the interpolation operation as a second interpolation operation in response to a variation being less than or equal to the threshold value.

6. The image processing device of claim 2, wherein the interpolation operation determiner calculates the gradient based on the pixel values and determines an interpolation operation corresponding to the gradient based on a predetermined threshold value.

7. The image processing device of claim 2, wherein the interpolation operation determiner determines an interpolation operation corresponding to the image pattern determined based on the pixel values.

8. The image processing device of claim 1, wherein the segment component processor generates the sub-regions based on at least one of a boundary included in the image or a color difference of the image.

9. The image processing device of claim 8, wherein each of the sub-regions has the same characteristic corresponding to a performed interpolation operation, and
the boundary is a dividing line between objects included in the image or a dividing line between an object and a background.

10. The image processing device of claim 1, wherein the image interpolator generates interpolation operation commands for each of the sub-regions, generates queues including interpolation operation commands corresponding to the same group, and simultaneously executes interpolation operation commands included in the same queue.

11. The image processing device of claim 10, wherein the image interpolator transmits the interpolation operation commands included in the same queue to graphics processing units, respectively, and controls the graphics processing units to simultaneously perform operations corresponding to the received interpolation operation commands.

12. An image processing device comprising:
a segment component processor configured to divide an image into sub-regions based on pixel values of the image received from outside of the image processing device and generate indication information indicating the sub-regions;
a sub-region manager configured to store indication information on sub-regions on which the same interpolation operation is performed based on interpolation operations to be performed on the sub-regions; and
an image interpolator configured to perform interpolation operations on the sub-regions on which the same interpolation operation is performed in parallel based on the indication information.

13. The image processing device of claim 12, wherein the sub-region manager further comprises an interpolation operation determiner configured to determine the interpolation operations to be performed on the sub-regions based on at least one of a variation of pixel values corresponding to each of the sub-regions, a gradient in a predetermined direction, or an image pattern of the sub-regions.

14. The image processing device of claim 13, wherein a single interpolation operation is performed in one sub-region,
the interpolation operation determiner determines to perform at least two interpolation operations in the sub-regions, and
the sub-region manager stores the indication information on the sub-regions on which the same interpolation operation is performed in the same buffer.

15. The image processing device of claim 14, wherein the image interpolator generates interpolation operation performance queues for the sub-regions based on the indication information stored in the same buffer, and simultaneously performs interpolation operations for the same queue, and
each of the interpolation operation performance queues includes indication information in the sub-regions on which the same interpolation operation is performed.

16. An image processing method comprising:
dividing an image into sub-regions based on pixel values of the image received from outside of an image processing device;
classifying the sub-regions into a plurality of groups according to interpolation operations to be performed on the sub-regions; and
performing interpolation operations on sub-regions of the same group in parallel.

17. The image processing method of claim 16, wherein classifying the sub-regions into the plurality of groups comprises:
including sub-regions, on which the same interpolation operation is to be performed, in the same group; and
determining the interpolation operations to be performed on the sub-regions based on at least one of a variation of pixel values corresponding to each of the sub-regions, a gradient in a predetermined direction, or an image pattern of the sub-regions.

18. The image processing method of claim 17, wherein determining the interpolation operations comprises:
calculating the variation based on the pixel values;
determining the interpolation operation as a first interpolation operation in response to a variation being greater than a predetermined threshold value; and
determining the interpolation operation as a second interpolation operation in response to a variation being less than or equal to the threshold value.

19. The image processing method of claim 16, wherein performing the interpolation operations in parallel comprises:
generating interpolation operation commands for each of the sub-regions;
generating queues including interpolation operation commands corresponding to the same group; and
simultaneously executing interpolation operation commands included in the same queue.

20. The image processing method of claim 19, wherein simultaneously executing the interpolation operation commands further comprises:
transmitting the interpolation operation commands included in the same queue to graphics processing units, respectively; and
controlling the graphics processing units to simultaneously perform operations corresponding to the received interpolation operation commands.

* * * * *